United States Patent
Deng et al.

(10) Patent No.: US 9,862,347 B2
(45) Date of Patent: Jan. 9, 2018

(54) VEHICLE IMPACT ABSORBING SYSTEM

(71) Applicant: Ford Global Technologies, LLC, Dearborn, MI (US)

(72) Inventors: Zhibing Deng, Northville, MI (US); Luis Enrique Castillo jaime, DF (MX); Srinivas Reddy Malapati, Novi, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/182,392

(22) Filed: Jun. 14, 2016

(65) Prior Publication Data

US 2017/0355342 A1    Dec. 14, 2017

(51) Int. Cl.
*B60R 21/231*    (2011.01)
*B60R 21/205*    (2011.01)
*B60R 21/203*    (2006.01)
*B60R 21/213*    (2011.01)
*B60R 21/232*    (2011.01)
*B60R 21/235*    (2006.01)
*B60R 21/264*    (2006.01)

(52) U.S. Cl.
CPC .......... *B60R 21/231* (2013.01); *B60R 21/203* (2013.01); *B60R 21/205* (2013.01); *B60R 21/213* (2013.01); *B60R 21/232* (2013.01); *B60R 21/235* (2013.01); *B60R 21/264* (2013.01); *B60R 2021/23107* (2013.01); *B60R 2021/23514* (2013.01)

(58) Field of Classification Search
CPC ... B60R 21/231; B60R 21/205; B60R 21/203; B60R 21/213; B60R 21/235; B60R 21/264; B60R 21/232; B60R 2021/23514; B60R 2021/23107
See application file for complete search history.

(56) References Cited

U.S. PATENT DOCUMENTS

| | | | | |
|---|---|---|---|---|
| 2,834,606 | A * | 5/1958 | Bertrand | B60R 21/16 206/522 |
| 5,333,899 | A * | 8/1994 | Witte | B60R 21/23138 280/728.1 |
| 6,431,586 | B1 * | 8/2002 | Eyrainer | B60R 21/213 280/730.1 |
| 8,764,053 | B1 | 7/2014 | Dix | |

(Continued)

FOREIGN PATENT DOCUMENTS

| | | |
|---|---|---|
| DE | 102011112880 A1 | 3/2013 |
| DE | 102013221983 A1 | 4/2015 |

(Continued)

OTHER PUBLICATIONS

UK Search Report dated Nov. 16, 2017 (rec'd. Nov. 20, 2017) re UK Appl. GB1709305.5.

*Primary Examiner* — Drew J Brown
(74) *Attorney, Agent, or Firm* — Frank A. MacKenzie; Bejin Bieneman PLC

(57) ABSTRACT

A first airbag has a first joining panel. A second airbag has a second joining panel. The first and second airbags are both inflatable from an uninflated position to an inflated position. The first and second joining panels are spaced from each other in the uninflated position. In the inflated position, the first joining panel is fixed to the second joining panel.

17 Claims, 8 Drawing Sheets

(56) References Cited

U.S. PATENT DOCUMENTS

| | | | |
|---|---|---|---|
| 9,114,777 B2 | 8/2015 | Fukawatase et al. | |
| 2004/0150203 A1* | 8/2004 | Cress | B60R 21/23 280/743.1 |
| 2008/0238045 A1* | 10/2008 | Garner | B60R 21/08 280/728.2 |
| 2014/0203541 A1* | 7/2014 | Wei | B60R 21/213 280/730.2 |
| 2014/0217709 A1 | 8/2014 | Fukawatase et al. | |
| 2015/0145234 A1 | 5/2015 | Wang et al. | |
| 2016/0200281 A1* | 7/2016 | Takeshita | B60R 21/233 280/730.2 |
| 2017/0072896 A1* | 3/2017 | Fukawatase | B60R 21/232 |

FOREIGN PATENT DOCUMENTS

| | | | |
|---|---|---|---|
| FR | 2927592 A1 | 8/2009 | |
| FR | 2957570 A1 | 9/2011 | |
| JP | 07232615 A * | 9/1995 | B60R 21/36 |
| JP | 2009051500 A | 3/2009 | |
| JP | 2013018378 A | 1/2013 | |
| WO | WO 2012111073 A1 | 8/2012 | |

* cited by examiner

VEHICLE IMPACT ABSORBING SYSTEM

BACKGROUND

An interior of a vehicle, such as an automobile, typically includes various devices for absorbing energy from an occupant of the vehicle during an impact of the vehicle. For example, the vehicle may include one or more airbags supported by a steering wheel, an instrument panel, and/or a roof of the vehicle. The airbags may be configured to absorb energy and soften impact between the body of the occupant and interior components of the vehicle, such as a vehicle pillar, e.g., an A-pillar.

Automobiles are subject to a variety of crash tests, including tests standardized by organizations such as the National Highway Traffic Safety Administration (NHTSA) and the Insurance Institute for Highway Safety (IIHS). For example, these tests may be directed toward a small overlap rigid barrier (SORB) front impact or a New Car Assessment Program (NCAP) offset impact (OI) to test airbag performance and reaction of seat occupants when the occupants move angularly, i.e., a forward and cross-vehicle direction. During this movement, the occupants may move toward the vehicle pillar or toward the center of the instrument panel.

DETAILED DESCRIPTION

Figure 1:
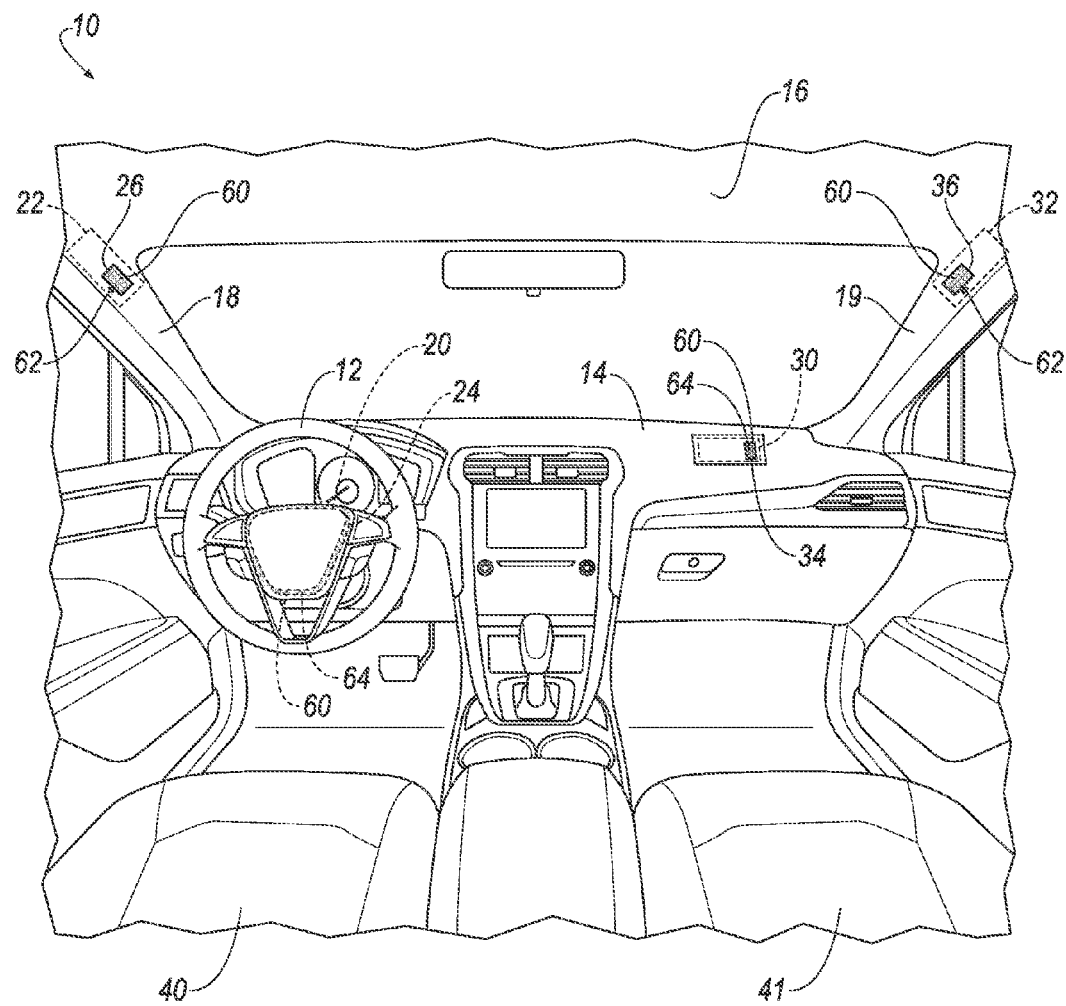
FIG. 1 is a view of an interior of a vehicle with a first airbag, a second airbag, a third airbag, and a fourth airbag each in an uninflated position.
Figure 2:
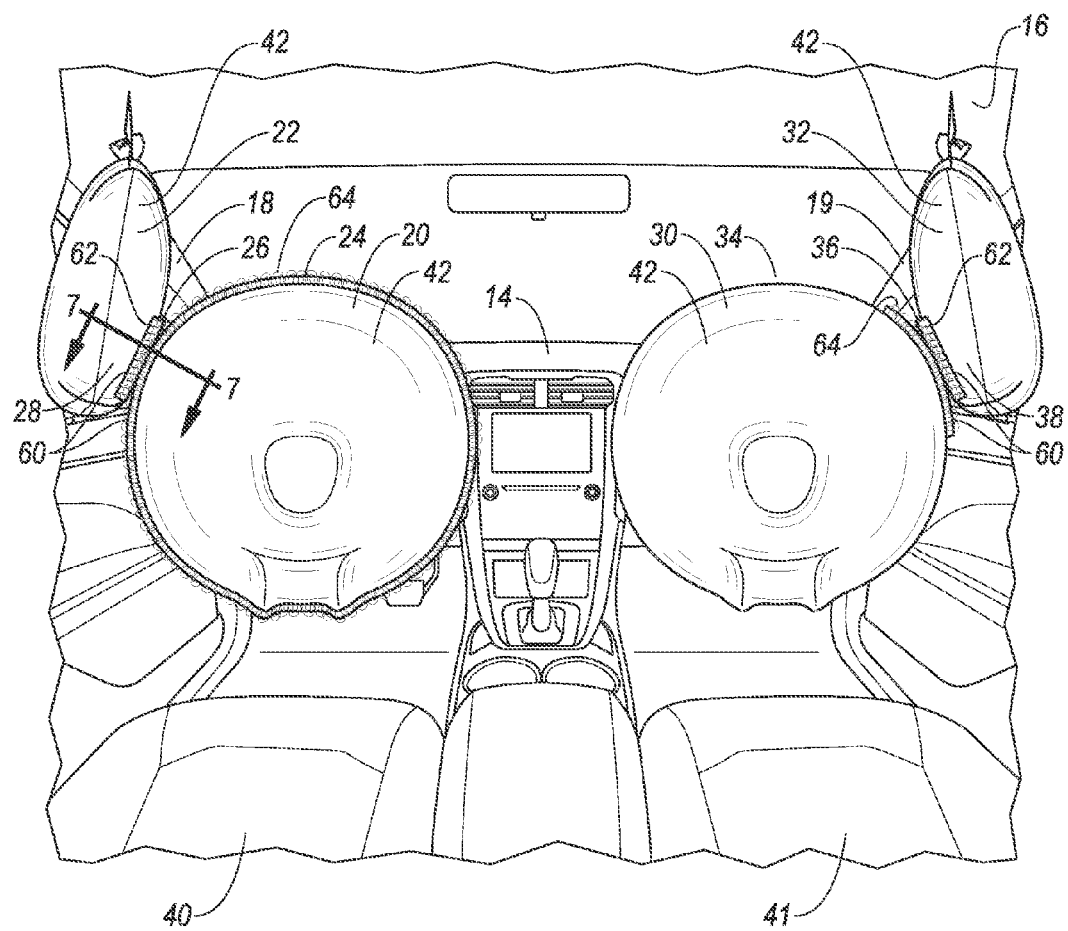
FIG. 2 is a view of the interior of the vehicle with the first airbag, a second airbag, a third airbag, and a fourth airbag each in an inflated position.

With reference to the Figures, wherein like numerals indicate like parts throughout the several views, a vehicle 10 may include a steering wheel 12, an instrument panel 14, a roof 16, and a front pillars 18, 19. With reference to FIG. 2, the vehicle 10 includes a first airbag 20 and a second airbag 22. The first airbag 20 has a first joining panel 24. The second airbag 22 has a second joining panel 26. The first and second airbags 20, 22 are both inflatable from an uninflated position, as shown in FIG. 1, to an inflated position, as shown in FIGS. 2-7B. With reference to FIG. 1, in the uninflated position, the first and second joining panels 24, 26 are spaced from each other. With reference to FIG. 2, in the inflated position, the first joining panel 24 is fixed to the second joining panel 26.

As set forth further below, the first and second joining panels 24, 26 may be fixed to each other in the inflated position in any suitable way, e.g., hook and loop fasteners 60, magnets 66, etc. When the first joining panel 24 is fixed to the second joining panel 26, the first and second airbags 20, 22 form an impact surface 28 to receive an occupant moving toward one of the front pillars 18 during a vehicle frontal impact, e.g., a SORB impact, offset impact, etc. The joining panels 24, 26 fix the first and second airbags 20, 22 to each other between the front pillar 18 and a front seat 40 in the inflated position, slowing movement of the occupant toward the front pillar 18 and/or preventing the occupant from impacting the front pillar 18.

The steering wheel 12 may be supported by the instrument panel 14. The occupant, i.e., a driver, uses the steering wheel 12 to steer the vehicle 10. The steering wheel 12 may be of any suitable type, and may be disposed on a left side or a right side of the vehicle, e.g., a left side or a right side of the instrument panel 14.

The instrument panel 14 supports the steering wheel 12. The instrument panel 14 may extend across a front of an interior (not numbered) of the vehicle 10 from one of the front pillars 18 to the other of the front pillars 19.

The roof 16 is disposed above the instrument panel 14 and the steering wheel 12. The roof 16 may include a headliner (not numbered). The front pillars 18, 19 support the roof 16. A windshield (not numbered) extends along the roof 16 from one of the front pillars 18 to the other front pillar 19 adjacent the instrument panel 14.

The vehicle 10 may include two front seats 40, 41, e.g., also referred to as a driver seat 40 and a passenger seat 41. The front seats 40, 41 support occupants while the vehicle 10 is in operation.

Figure 6:
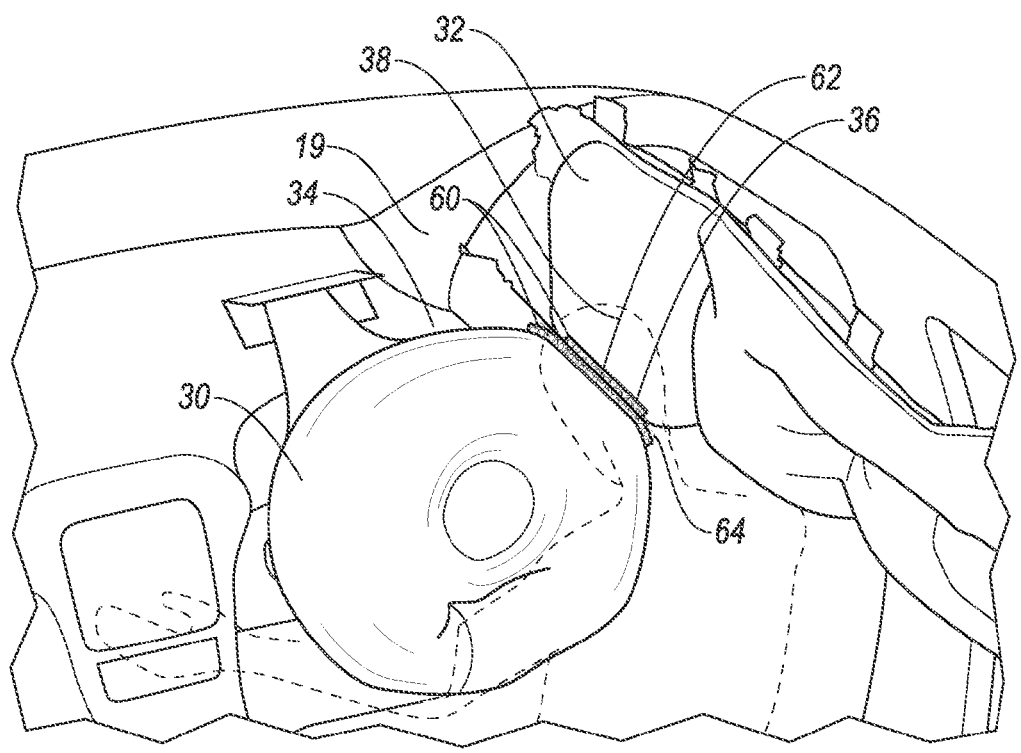
FIG. 6 is a perspective view of the third airbag and the fourth airbag of the plurality of airbags fixed to each other receiving another occupant.

As set forth above, the vehicle 10 may include the first airbag 20 and the second airbag 22. The first and second joining panels 24, 26 of the first and second airbags 20, 22, respectively, are arranged to form the impact surface 28 on the first and second airbags 20, 22 between the front pillar 18 and the front seat 40 when the first and second airbags 20, 22 are in the inflated position. Similarly, as shown in FIGS. 2 and 6, the vehicle 10 may include a third airbag 30 and a fourth airbag 32. The third airbag 30 may include a third joining panel 34, and the fourth airbag 32 may include a fourth joining panel 36. The third and fourth joining panels 34, 36 of the third and fourth airbags 30, 32 are arranged to form an impact surface 38 on the third and fourth airbags 30, 32 between the front pillar 19 and the front seat 41 when the third and fourth airbags 30, 32 are in the inflated position. The adjectives "first," "second," "third," "fourth," etc., are used herein merely as modifiers and are not intended to indicate order or importance.

The first airbag 20 and the third airbag 30 may be supported by the instrument panel 14. Specifically, as described above, the first airbag 20 may be supported by the steering wheel 12, i.e., the first airbag 20 may be a driver airbag. The first airbag 20 may be disposed in the steering wheel 12 in the uninflated position and may extend from the steering wheel 12 to the inflated position. The third airbag 30 may be disposed in the instrument panel 14 in the uninflated position and may extend from the instrument panel 14 to the inflated position, i.e., the third airbag 30 may be a passenger airbag.

The second airbag 22 and the fourth airbag 32 may be supported by the roof 16, i.e., the second airbag 22 and the fourth airbag 32 may be side curtain airbags.

Figure 7A:
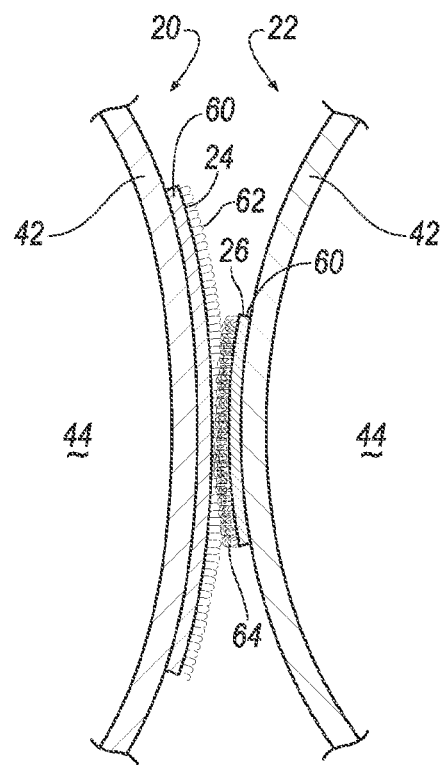
FIG. 7A is a cross-sectional view of a portion of the first airbag and the second airbag along the line 7-7 of FIG. 2.
Figure 7B:
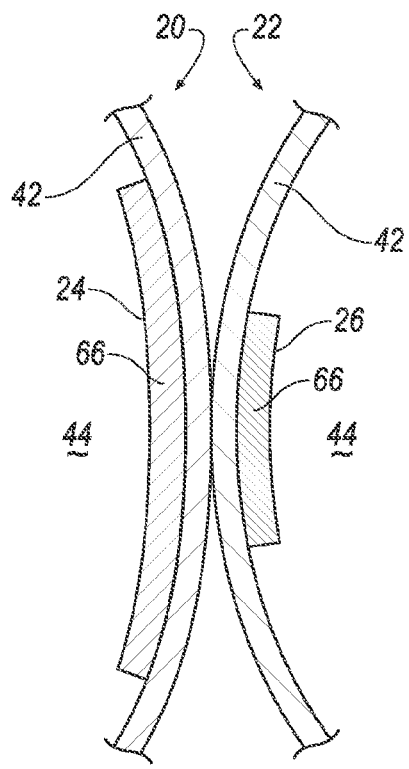
FIG. 7B is the same cross-sectional view of FIG. 7A showing another embodiment of the first and second airbag with the joining panels being magnets on an interior of the first airbag and the second airbag.

As shown in FIG. 2, the airbags 20, 22, 30, 32 each include a fabric panel 42. The fabric panels 42 each define respective inflation chambers 44. For example, the respective inflation chambers 44 of the first and second airbags 20, 22 are shown in FIGS. 7A-7B. The inflation chambers 44 receive an inflation medium, e.g., a gas, to inflate the airbags 20, 22, 30, 32 from the uninflated position to the inflated position.

The fabric panels 42 may be formed of any suitable material, for example, a woven polymer. For example, the fabric panels 42 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorganosiloxane.

The joining panels 24, 26, 34, 36 may be fixed to the fabric panels 42 of the airbags 20, 22, 30, 32, respectively, in any suitable manner. For example, the joining panels 24, 26, 34, 36 may be fixed to the fabric panels 42, respectively, by stitching, adhesive, etc.

Any one of the joining panels 24, 26, 34, 36 may be exterior to the inflation chambers 44 of the airbags 20, 22, 30, 32, respectively. Alternatively, or additionally, any one of the joining panels 24, 26, 34, 36 may be in the inflation chambers 44 of the airbags 20, 22, 30, 32, respectively. As one example, as shown in FIG. 7A, the first and second joining panels 24, 26 may both be exterior to the inflation chambers 44 of the first and second airbags 20, 22. As another example, as shown in FIG. 7B, the first and second joining panels 24, 26 may both be in the inflations chambers 44 of the first and second airbags 20, 22.

As set forth above, the first joining panel 24 and the second joining panel 26 may be positioned such that the first joining panel 24 is fixed to the second joining panel 26 in the inflated position. In other words, the first joining panel 24 and the second joining panel 26 may be sized, shaped, and positioned on the respective fabric panel 42 such that the first joining panel 24 and the second joining panel 26 are adjacent as the first and second airbags 20, 22 are being inflated from the uninflated position to the inflated position and/or when the first and second airbag 20, 22 are in the inflated position. Similarly, the third joining panel 34 and the fourth joining panel 36 may be positioned such that the third joining panel 34 is fixed to the fourth joining panel 36 in the inflated position.

Figure 3:
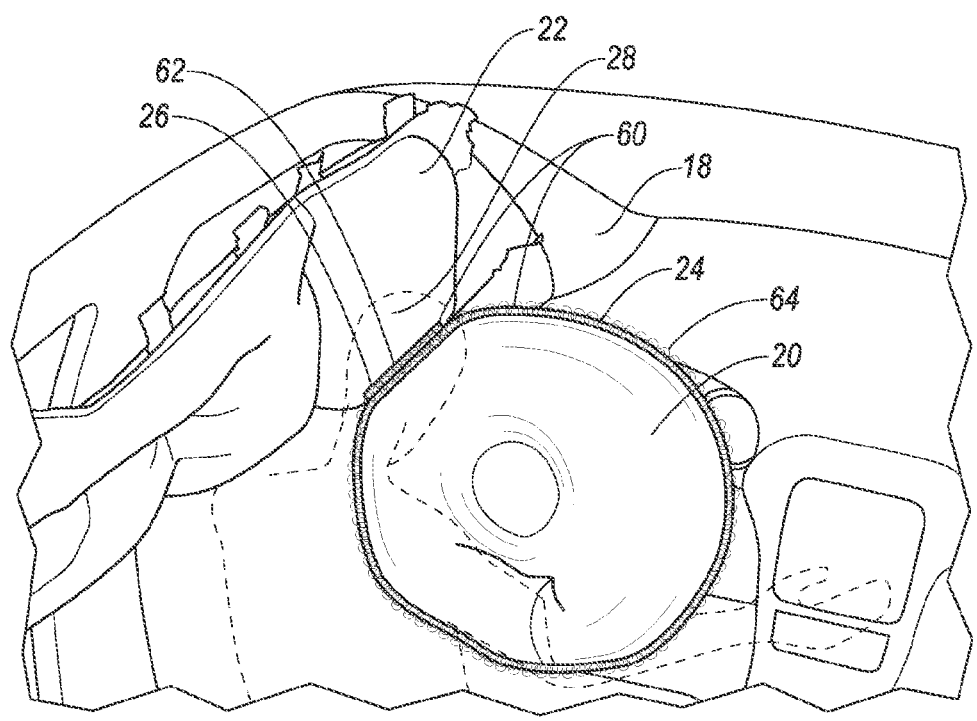
FIG. 3 is a perspective view of the first airbag and the second airbag in the inflated position and fixed to each other receiving an occupant.

The first joining panel 24 may be positioned to be fixed to the second joining panel 26 at all rotational positions of the steering wheel 12 relative to the instrument panel 14, e.g., when the steering wheel 12 is being turned to turn the vehicle 10. As one example, the first joining panel 24 may extend around a perimeter of the first airbag 20, as shown in FIGS. 2-3 and 4B. As one example, the first joining panel 24 may extend continuously around the perimeter, e.g., the first joining panel 24 may be ring-shaped and may extend concentrically about the first airbag 20. As another example, the first joining panel 24 may include discrete segments spaced from each other about the perimeter of the first airbag 20.

The third joining panel 34 may be identical to, or different than, the first joining panel 24. For example, as shown in FIGS. 2 and 6, the third joining panel 34 may be a strip.

Figure 4A:
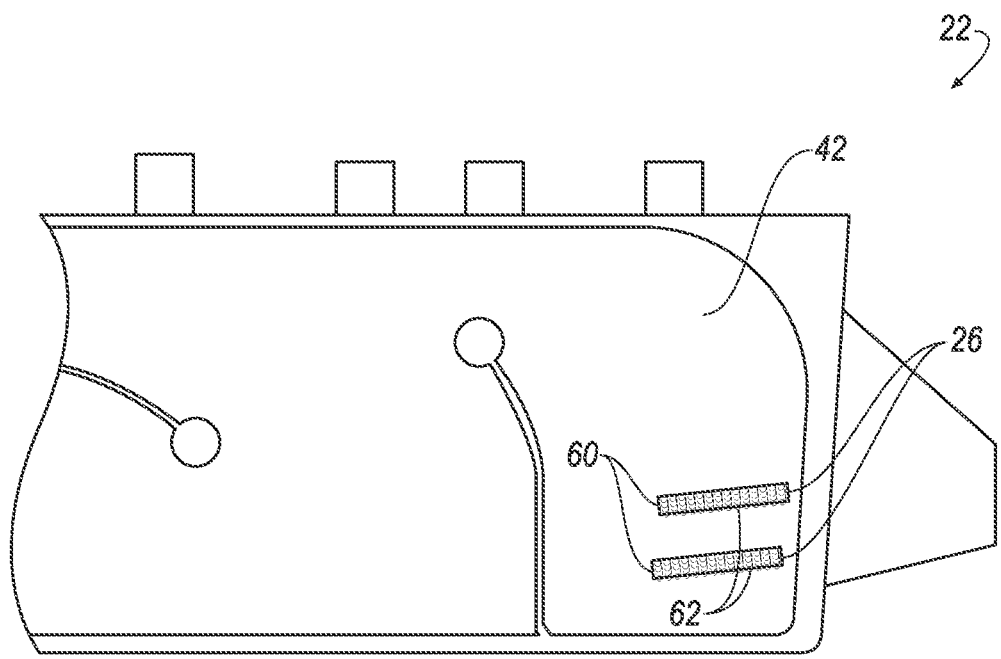
FIGS. 4A-4B are perspective views of the first and second airbags in the inflated position including a first joining panel and a second joining panel, respectively, are hook and loop fasteners.
Figure 4B:
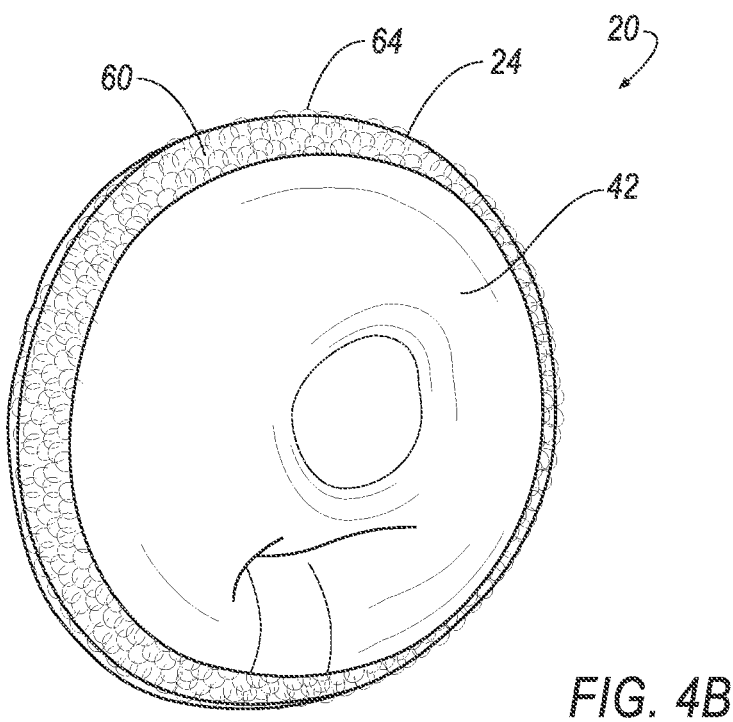
Figure 5A:
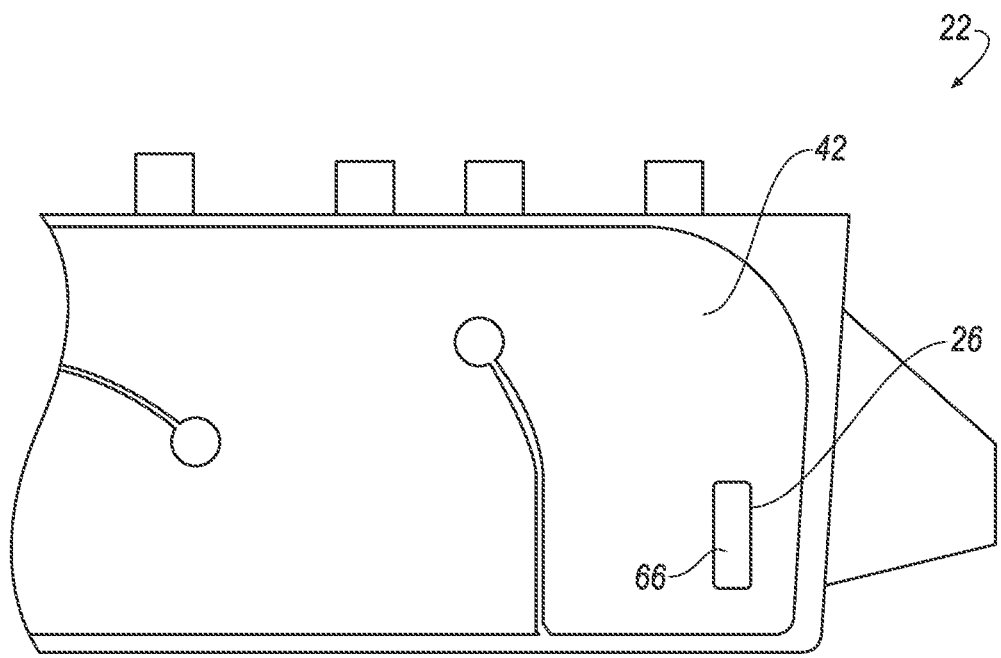
FIGS. 5A-5B are perspective views of another embodiment of the first and second airbags where the first and second joining panels are magnets.

The second joining panel 26 may be multiple strips, as shown in FIG. 4A. Alternatively, as shown in FIG. 5A, the second joining panel 26 may be a single strip. Alternatively, the second joining panel 26 may be of any suitable size and shape. The fourth joining panel 36 may be identical to, or different than, the second joining panel 26.

The vehicle 10 includes means for fixing the fabric panels 42 of first airbag 20 and the second airbag 22 to each other when the first airbag 20 and the second airbag 22 are in the inflated position. The means for fixing can include the joining panels 24, 26, as described above and below and structural equivalents thereof. For example, as set forth above, the means for fixing can include the magnets 66, the hook and loop fasteners 60, and structural equivalents thereof. The vehicle 10 may also include means for fixing the third airbag 30 to the fourth airbag 32 when the third and fourth airbags 30, 32 are in the inflated position. The means for fixing the third airbag 30 to the fourth airbag 32 may be identical to, or different than, the means for fixing the first airbag 20 to the second airbag 22.

With reference to FIGS. 2-4B, the first and second joining panels 24, 26 may be hook and loop fasteners 60. The hook and loop fasteners 60 include a plurality of hooks 62 that mate with a plurality of loops 64. Specifically, the first joining panel 24 may include a first side of the hook and loop fastener 60, i.e., one of a hook 62 arrangement or a loop 64 arrangement, and the second joining panel 26 may include a second side of the hook and loop fastener 60, i.e., the other of the hook 62 arrangement or the loop 64 arrangement. When the first and second airbags 20, 22 are inflated to the inflated position, the first side of the hook and loop fastener 60 contacts the second side of the hook and loop fastener 60, (i.e., the hooks 62 engage the loops 64) fixing the first and second joining panels 24, 26 to each other. As shown in FIG. 4A, in the embodiment where the first and second joining panels 24, 26 are the hook and loop fastener 60, the second joining panel 26 may include two strips.

One of the sides of the hook and loop fastener 60 includes a plurality of hooks 62, and the other side of the hook and loop fastener 60 includes a plurality of loops 64 arranged to receive the hooks 62. When the first side of the hook and loop fastener 60 contacts the second side of the hook and loop fastener 60, the first and second sides becomes fixed together as the hooks 62 mate with the loops 64. The mating of the hooks 62 and the loops 64 fixes the two sides of the hook and loop fastener 60 together, and thus the first and second joining panels 24, 26 become fixed. Thus, when the first and second airbags 20, 22 are in the inflated positions, the first and second joining panels 24, 26 are positioned such that the first side and the second side of the hook and loop fasteners 60 contact each other, fixing the first joining panel 24 to the second joining panel 26. The third and fourth joining panels 34, 36 may also be hook and loop fasteners 60 that operate in the same manner as described above for the first and second joining panels 24, 26.

Figure 5B:
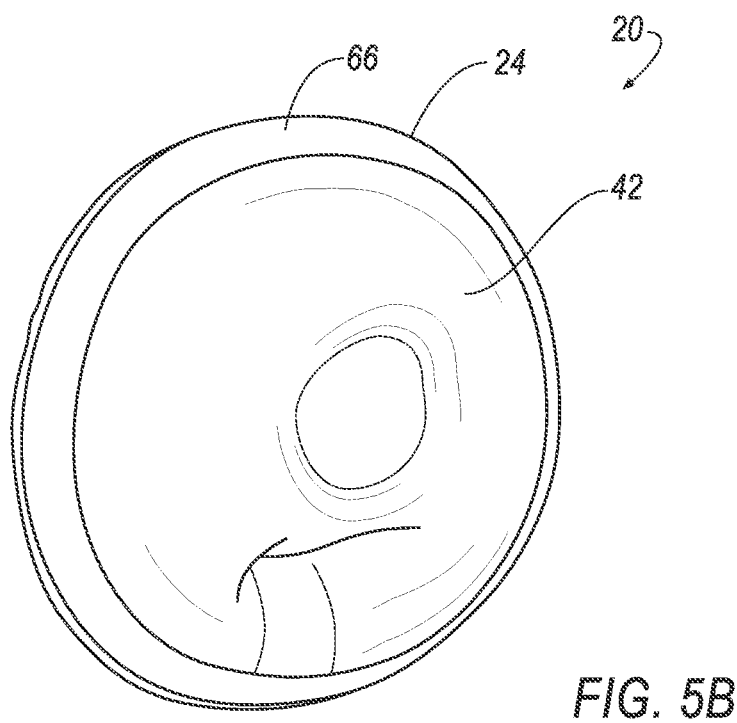

With reference to FIGS. 5A-5B, the first and second joining panels 24, 26 may each be a magnet 66. The magnets 66 may be positioned to enter into each other's magnetic field when the first and second airbags 20, 22 are inflated to the inflated positions and to fix the first and second joining panels 24, 26 by magnetic force. That is, the magnets 66 may be positioned so that opposite poles of the magnets 66 are attracted to each other during inflation to move the first and second joining panels 24, 26 toward each other until the first and second joining panels 24, 26 are fixed. The magnets 66 may be flexible magnets, e.g., magnetic tape, magnetic sheets, magnetic paint, magnetic coating, etc. Alternatively, one of the first and second joining panels 24, 26 may be a magnet 66, and the other of the first and second joining panels 24, 26 may be a panel constructed of a ferromagnetic material, e.g., iron, nickel, cobalt, ferrite, etc., that is not magnetized. For example, in a configuration where the first joining panel 24 is constructed of unmagnetized iron, and the second joining panel 26 includes the magnet 66, the magnet 66 will attract the iron in the first joining panel 24, moving the first joining panel 24 toward the second joining panel 26 until the first and second joining panels 24, 26 are fixed.

An inflator 46 is connected to each of the airbags 20, 22, 30, 32, as shown in FIG. 1. Upon receiving a signal from, e.g., a vehicle controller 48, the inflators 46 may inflate their respective airbags 20, 22, 30, 32 with an inflatable medium, such as a gas. The inflators 46 may be, for example, a pyrotechnic inflator that uses a chemical reaction to drive inflation medium to the airbags 20, 22, 30, 32. The inflators 46 may be of any suitable type, for example, a cold-gas inflator. The inflators 46 are in communication with the inflation chamber of each airbag.

Figure 8:
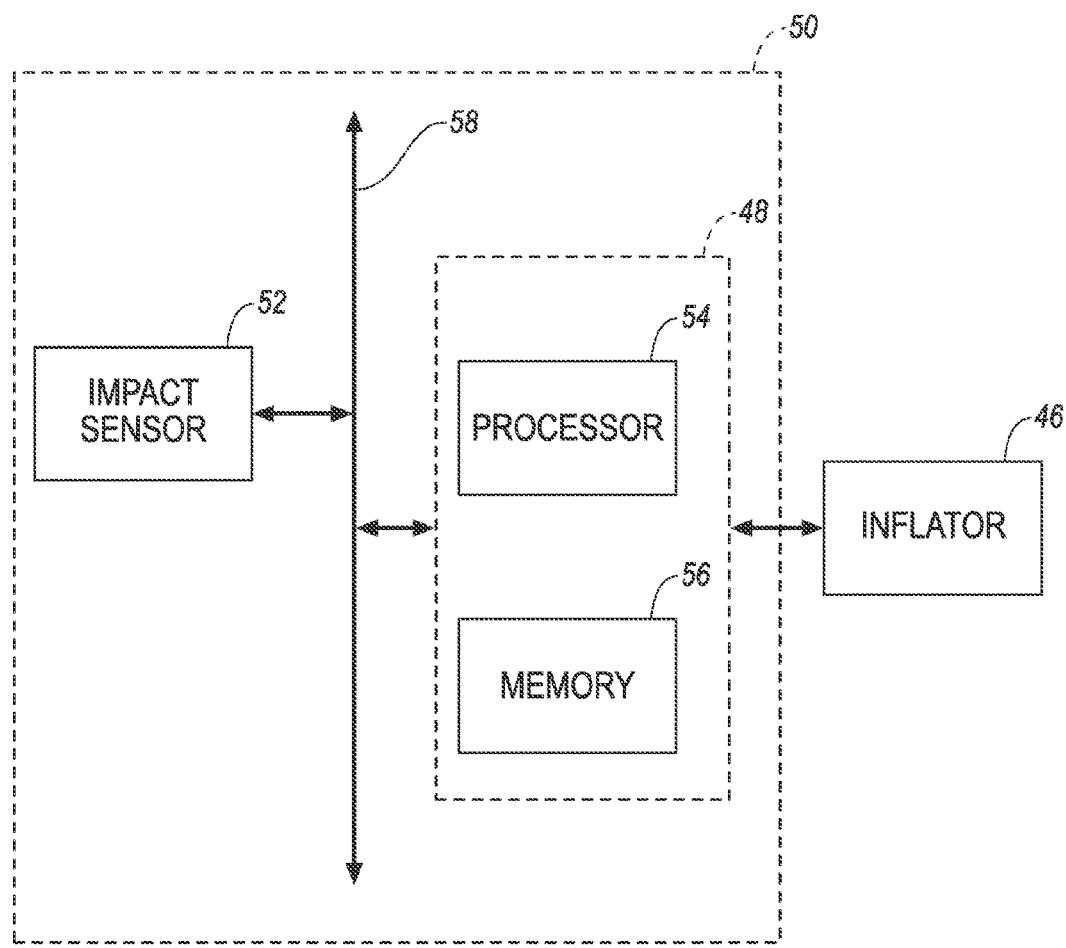
FIG. 8 is a schematic of an inflation system for inflating the airbags during the impact.

With reference to FIG. 8, the vehicle 10 may include an inflation system 50. The inflation system 50 may include an impact sensor 52 and a controller 48. The controller 48 is in communication with the inflators 46 and may include a processor 54 and a memory 56. The memory 56 stores instructions executable by the processor 54 to control the inflators 46. The controller 48 may be programmed to, upon identification of an impact, cause triggering of the inflators 46, extending the airbags 20, 22, 30, 32.

The impact sensor 52 may be in communication with the controller 48 to communicate data to the controller 48. The impact sensor 52 may be of any suitable type, e.g., using accelerometers, radar, lidar, and/or a vision system. The vision system may include one or more cameras, CCD image sensors, and/or CMOS image sensors, etc. Based on data communicated by the impact sensor 52, the controller 48 may cause triggering the inflators 46.

Communications between the controller 48, the impact sensor 52, the inflators 46, and/or other components in the vehicle 10, may be connected to a communication bus 58, such as a controller area network (CAN) bus, of the vehicle 10. The controller 48 may use information from the communication bus 58 to control the triggering of the inflators 46. The inflators 46 may be connected to the controller 48 or may be connected to the communication bus 58.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a first airbag having a first joining panel extending around a perimeter of the first airbag; and
a second airbag having a second joining panel;
wherein the first and second airbags are both inflatable from an uninflated position in which the first and second joining panels are spaced from each other to an inflated position in which the first joining panel is fixed to the second joining panel.

2. The system of claim 1, wherein the first and second joining panels each include a magnet.

3. The system of claim 1, wherein the first joining panel includes a first side of a hook and loop fastener and the second joining panel includes a second side of the hook and loop fastener.

4. The system of claim 3, wherein the first airbag includes a fabric panel defining an inflation chamber and the second airbag includes a fabric panel defining an inflation chamber, wherein the first side of the hook and loop fastener is fixed to the fabric panel of the first airbag external to the inflation chamber, and wherein the second side of the hook and loop fastener is fixed to the fabric panel of the second airbag external to the inflation chamber.

5. The system of claim 1, further comprising a third airbag having a third joining panel, and wherein the third airbag is inflatable to an inflated position in which the third joining panel is fixed to a fourth joining panel.

6. The system of claim 5, wherein the third joining panel extends around a perimeter of the third airbag.

7. The system of claim 1, further comprising a steering wheel supporting the first airbag and a vehicle roof supporting the second airbag.

8. The system of claim 1 further comprising a front pillar and a driver seat, the first and second joining panels being disposed between the front pillar and the driver seat when the first and second airbags are in the inflated position.

9. The system of claim 1, wherein the first airbag includes a fabric panel defining an inflation chamber and fixed to the first joining panel, and wherein the second airbag includes a fabric panel defining an inflation chamber and fixed to the second joining panel.

10. The system of claim 9, wherein the first and second joining panels are exterior to the inflation chambers of the first and second airbags, respectively.

11. The system of claim 9, wherein the first and second joining panels are in the inflation chambers of the first and second airbags, respectively.

12. The system of claim 9, wherein the first airbag includes an inflator in communication with the inflation chamber of the first airbag, and wherein the second airbag includes an inflator in communication with the inflation chamber of the second airbag.

13. An airbag comprising:
a fabric panel defining an inflation chamber; and
a magnet fixed to the fabric panel, the magnet extending around a perimeter of the inflation chamber.

14. The airbag of claim 13 further comprising an inflator in communication with the inflation chamber.

15. The airbag of claim 13, wherein the magnet is exterior to the inflation chamber.

16. The airbag of claim 13, wherein the magnet is in the inflation chamber.

17. A system comprising:
a first airbag and a second airbag each including a fabric panel inflatable from an uninflated position to an inflated position;
the first airbag and the second airbag each including joining panels spaced from each other in the uninflated positions; and
means for fixing the joining panels of first airbag to the second airbag to each other when the first airbag and the second airbag are in the inflated position;
wherein the means for fixing the joining panels extends around a perimeter of the first airbag.

* * * * *